(12) United States Patent
Kim et al.

(10) Patent No.: US 7,068,718 B2
(45) Date of Patent: Jun. 27, 2006

(54) ADVANCED METHOD FOR RATE CONTROL AND APPARATUS THEREOF

(75) Inventors: So-young Kim, Seoul (KR); Jeong-hoon Park, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 690 days.

(21) Appl. No.: 10/259,548

(22) Filed: Sep. 30, 2002

(65) Prior Publication Data

US 2004/0017850 A1 Jan. 29, 2004

(30) Foreign Application Priority Data

Jul. 27, 2002 (KR) ............... 2002-44501

(51) Int. Cl.
*H04N 7/12* (2006.01)
(52) U.S. Cl. ................................. 375/240.02
(58) Field of Classification Search ...............
375/240.02–240.07
See application file for complete search history.

(56) References Cited

U.S. PATENT DOCUMENTS

| | | | | |
|---|---|---|---|---|
| 5,790,196 A * | 8/1998 | Sun et al. | ............. | 375/240.05 |
| 5,926,222 A * | 7/1999 | Nickerson | ............. | 375/240.04 |
| 5,969,764 A * | 10/1999 | Sun et al. | ............. | 375/240.06 |
| 6,526,097 B1 * | 2/2003 | Sethuraman et al. | ..... | 375/240.2 |
| 2002/0012395 A1 * | 1/2002 | Song et al. | ............. | 375/240.03 |
| 2002/0085636 A1 * | 7/2002 | Uenoyama et al. | .... | 375/240.12 |
| 2002/0114393 A1 * | 8/2002 | Vleeschouwer | ........ | 375/240.16 |
| 2003/0152151 A1 * | 8/2003 | Hsieh et al. | ........... | 375/240.26 |

FOREIGN PATENT DOCUMENTS

| | | |
|---|---|---|
| JP | 6-30396 A | 2/1994 |
| JP | 06-030396 | * 4/1994 |

OTHER PUBLICATIONS

Ding et al, "Rate Control of MPEG Video Coding and Recording By Rate-Quantization Modeling", IEEE Transactions on Circuits and Systems for Video Technology, vol. 6, iss. 1, pp. 12-20, Feb. 1996.*
Vetro et al, "Rate-Distorion Optimized Video Coding Considering Frameskip", International Conference on Image Processing, IEEE, vol. 3, pp. 534-537, Oct. 2001.*

* cited by examiner

*Primary Examiner*—Vu Le
(74) *Attorney, Agent, or Firm*—Sughrue Mion, PLLC (57) ABSTRACT

A rate control method used in encoding images is provided, including setting initial values for rate control and encoding; calculating a target encoding bit value based on the set initial values; performing rate control and encoding of a current bit stream based on the calculated target encoding bit value; measuring the picture quality of the current encoded bit stream, determining whether or not to skip the current encoded bit stream based on the measured picture quality, and generating a current encoded bit stream skip control signal; and controlling skipping of the current encoded bit stream, based on the current bit stream skip control signal provided by a picture quality measuring and skip control signal generating unit. In the method, a bit rate is controlled by considering the picture quality of an encoded bit stream such that a constant bit rate and appropriate picture quality can be maintained simultaneously.

32 Claims, 9 Drawing Sheets

ADVANCED METHOD FOR RATE CONTROL AND APPARATUS THEREOF

BACKGROUND OF THE INVENTION

1. Field of the Invention

The present invention relates to a rate control method and apparatus for encoding moving pictures, and more particularly, to a rate control apparatus and method for maintaining a constant bit rate and constant picture quality at the same time, and a computer readable recording medium having embodied thereon a computer program for the method. The present application is based on Korean Patent Application No. 2002-44501, which is incorporated herein by reference.

2. Description of the Related Art

In general, when moving pictures are encoded, the amount of bits generated in an encoder varies according to the characteristics of scenes. In order for the encoder to transmit moving picture information in real time through a transmission channel having a constant transmission speed, it is necessary to adjust image information, which is encoded and transmitted, to a predetermined bit rate. To do this, first, encoded image information is stored in a buffer having a predetermined size and then transmitted to a decoder at a predetermined transmission speed. At this time, the method for controlling the encoder in order to prevent an underflow or overflow is referred to as a bit rate control method.

Rate control methods can be divided into two methods: a frame-based rate control method in which image data that are input at a predetermined time interval are controlled in units of frames, and a method in which an input image is divided into blocks, each having a predetermined size, that is, a macro block, and the image is controlled in units of macro blocks.

Figure 1:
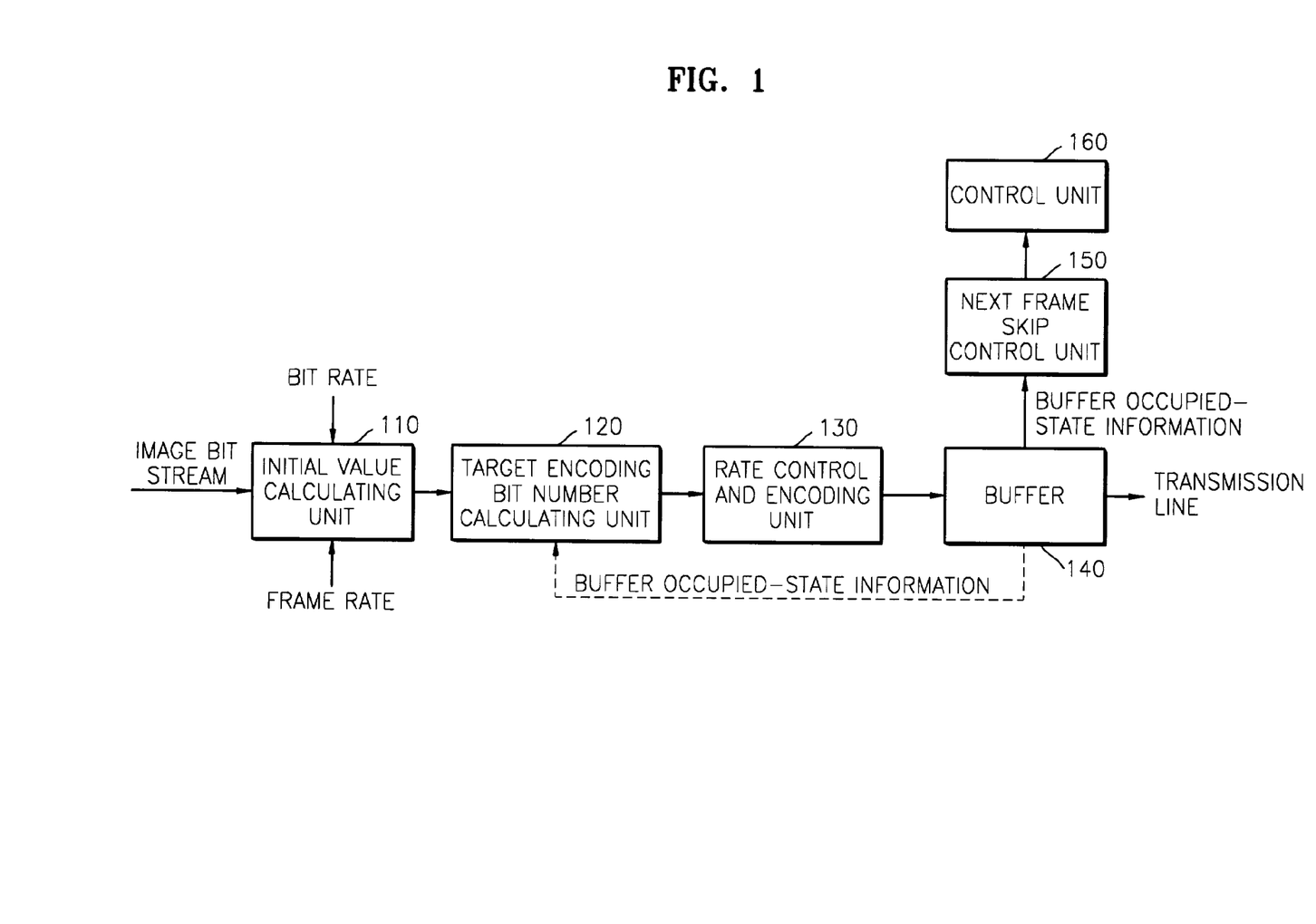
FIG. 1 is a block diagram of a prior art rate control apparatus.

FIG. 1 is a block diagram of a rate control apparatus according to the prior art method for controlling a bit rate in units of frame.

An initial value calculating unit 110 receives a requested bit rate and the frame rate of the input frames that are desired to be encoded. Then, the initial value calculating unit 110 calculates an initial value needed in controlling a bit rate and transmits the result to a target encoding bit number calculating unit 120. In general, initial value calculation is performed only once in the beginning stage of encoding.

The target encoding bit number calculating unit 120 calculates the number of bits that can be assigned to each frame, by using the initial values calculated in the initial value calculating unit 110. Considering the calculated number of bits that can be assigned to each frame and the state of a buffer 140 so as to prevent an overflow or an underflow, the target encoding bit number calculating unit 120 calculates the number of target encoding bits of the frame that is currently being encoded. At this time, the number of bits that can be assigned to each frame is obtained by subtracting the number of bits that are already encoded and used from the number of the total number of bits for satisfying a requested bit rate, and then dividing the number of remaining bits by the number of remaining frames. Also, the state of the buffer 140 may be input directly from the buffer 140 or may be obtained by calculation using the bit rate, the number of encoding bits of the previous frame, and the buffer state in the previous frame.

A rate control and encoding unit 130 controls the encoding process so that a bit stream which is encoded to approximate to the target encoding bit number provided by the target encoding bit number calculating unit 120 is output. This will be explained later referring to FIG. 2.

The buffer 140 receives and stores the encoded bit stream, and then transmits the bit stream to a decoder (not shown) through a transmission line.

After the encoding process for one frame is finished, a next frame skip control unit 150 receives information on the current occupied state of the buffer from the buffer 140. If it is determined that the filled state of the bit stream in the buffer 140 exceeds a predetermined limit, the next frame skip control unit 150 generates a frame skip control signal so that the next frame is not encoded in order to prevent loss of image information due to an overflow in the buffer 140, and outputs the generated frame skip control signal to a control unit 160.

The control unit 160 controls the entire encoding process, and in particular receives the frame skip control signal for controlling the bit rate and determines whether or not to encode the next input frame.

Figure 2:
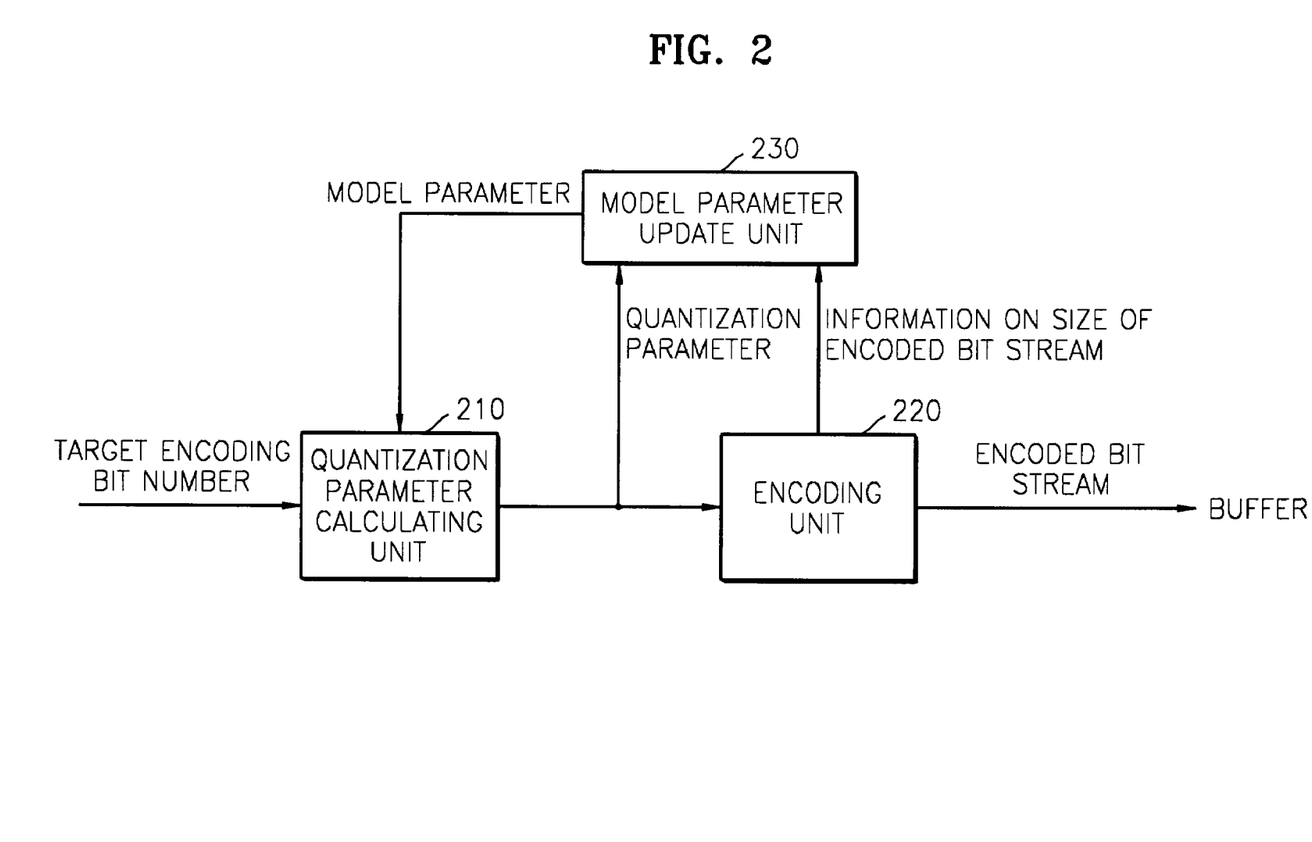
FIG. 2 is a block diagram of a rate control and encoding unit of the prior art bit rate control apparatus of FIG. 1.

FIG. 2 is a block diagram of the rate control and encoding unit 130 of the prior art rate control apparatus of FIG. 1.

A quantization parameter calculation unit 210 receives a target encoding bit number from the target encoding bit number calculating unit 120, and model parameters for calculating a quantization parameter from a model parameter update unit 230, and calculates a quantization parameter. The calculated quantization parameter is used in an encoding unit 220 and the model parameter update unit 230.

The encoding unit 220 receives the quantization parameter calculated in the quantization parameter calculating unit 210, performs actual encoding, and sends an encoded bit stream to the buffer 140. Also, the encoding unit 220 sends the size of the encoded bit stream to the model parameter update unit 230.

The model parameter update unit 230 updates the model parameter by using the quantization parameter information calculated in the quantization parameter calculating unit 210 and the size information of the bit stream encoded in the encoding unit 220. That is, the model parameter update unit 230 updates the model parameter by using the already used quantization parameter value and the size of the bit stream encoded according to the parameter value. At this time, the information used here includes quantization parameter information and size information of the encoded bit stream that are used for frames in the range of a sliding window, after applying the sliding window to the frames close to the currently encoded frame on the time axis. Thus, the model parameter update unit 230 employs the sliding window method and reflects information on a predetermined number of encoded frames to the current frame to update the model.

Thus, in the prior art, in order to efficiently adjust a transmission rate on a transmission line, encoding of the next frame is skipped according to the state of the buffer. However, only the buffer state of the encoder is considered in the prior art without considering the characteristics of input image data. Accordingly, if a model applied to the previous frame does not work appropriately in the current frame because of changes in the characteristics of input image data, the quality of the encoded frame is degraded. Also, if an excessive number of bits are used according to a wrongfully selected quantization parameter value, the number of bits assigned to the next frames decreases to cause a degraded picture quality.

SUMMARY OF THE INVENTION

To solve the above problems, it is an objective of the present invention to provide an apparatus and method for preventing degradation of picture quality to a predetermined extent and controlling a bit rate, and a computer readable medium therefor.

To solve the above problems, it is another objective of the present invention to provide an improved rate control apparatus and method in which a model parameter is updated by measuring the picture quality of the current encoded frame so that a more accurate rate distortion (RD) model is applied to the frames succeeding the current frame, and a computer readable medium therefor.

According to an aspect of the present invention, there is provided a rate control apparatus comprising an initial value setting unit which sets initial values for rate control and encoding; a target bit value calculating unit which calculates a target encoding bit value based on the set initial values; a rate control and encoding unit which performs rate control and encoding based on the calculated target encoding bit value; a picture quality measuring and skip control signal generating unit which measures the picture quality of the current encoded bit stream, determines whether or not to skip the current encoded bit stream based on the measured picture quality, and generates a current encoded bit stream skip control signal; and a control unit which controls skip of the current encoded bit stream, based on the current bit stream skip control signal provided by the picture quality measuring and skip control signal generating unit.

According to another aspect of the present invention, there is provided a rate control method comprising setting initial values for bit rate control and encoding; calculating a target encoding bit value based on the set initial values; performing rate control and encoding based on the calculated target encoding bit value; measuring the picture quality of the current encoded bit stream, determining whether or not to skip the current encoded bit stream, based on the measured picture quality, and generating a current encoded bit stream skip control signal; and controlling skip of the current encoded bit stream, based on the current bit stream skip control signal.

According to another aspect of the present invention, there is provided a computer readable medium in a rate control apparatus, the computer readable medium having embodied thereon a computer program for a method comprising setting initial values for rate control and encoding; calculating a target encoding bit value based on the set initial values; performing rate control and encoding based on the calculated target encoding bit value; measuring the picture quality of the current encoded bit stream, determining whether or not to skip the current encoded bit stream based on the measured picture quality, and generating a current encoded bit stream skip control signal; and controlling skip of the current encoded bit stream based on the current bit stream skip control signal.

According to another aspect of the present invention, there is provided a rate control apparatus comprising an initial value setting unit which sets initial values for rate control and encoding; a target bit value calculating unit which calculates a target encoding bit value based on the set initial values; a rate control and encoding unit which performs bit rate control and encoding based on the calculated target encoding bit value; a picture quality measuring unit which measures the picture quality of the current encoded bit stream; and a bit rate control information generating unit which compares the measured picture quality with the scope of a predetermined reference picture quality to determine whether or not the measured picture quality is within the scope, and if the measured picture quality exceeds the predetermined scope of the reference picture quality, generates bit rate control information for bit rate control and sends the information to the rate control and encoding unit.

According to another aspect of the present invention, there is provided a rate control method comprising setting initial values for rate control and encoding; calculating a target encoding bit value based on the set initial values; performing rate control and encoding based on the calculated target encoding bit value; measuring the picture quality of the current encoded bit stream; and comparing the measured picture quality with the scope of a predetermined reference picture quality to determined whether or not the measured picture quality is within the scope, and if the measured picture quality exceeds the predetermined scope of the reference picture quality, updating a bit rate control information for rate control.

According to another aspect of the present invention, there is provided a computer readable medium in a rate control apparatus, the computer readable medium having embodied thereon a computer program for a method comprising setting initial values for rate control and encoding; calculating a target encoding bit value based on the set initial values; performing rate control and encoding based on the calculated target encoding bit value; measuring the picture quality of the current encoded bit stream; and comparing the measured picture quality with the scope of a predetermined reference picture quality to determine whether or not the measured picture quality is within the scope, and if the measured picture quality exceeds the predetermined scope of the reference picture quality, updating a bit rate control information for bit rate control.

BRIEF DESCRIPTION OF THE DRAWINGS

The above objects and advantages of the present invention will become more apparent by describing in detail illustrative, non-limiting embodiments thereof with reference to the attached drawings in which.

DESCRIPTION OF THE ILLUSTRATIVE, NON-LIMITING EMBODIMENTS

Figure 3:
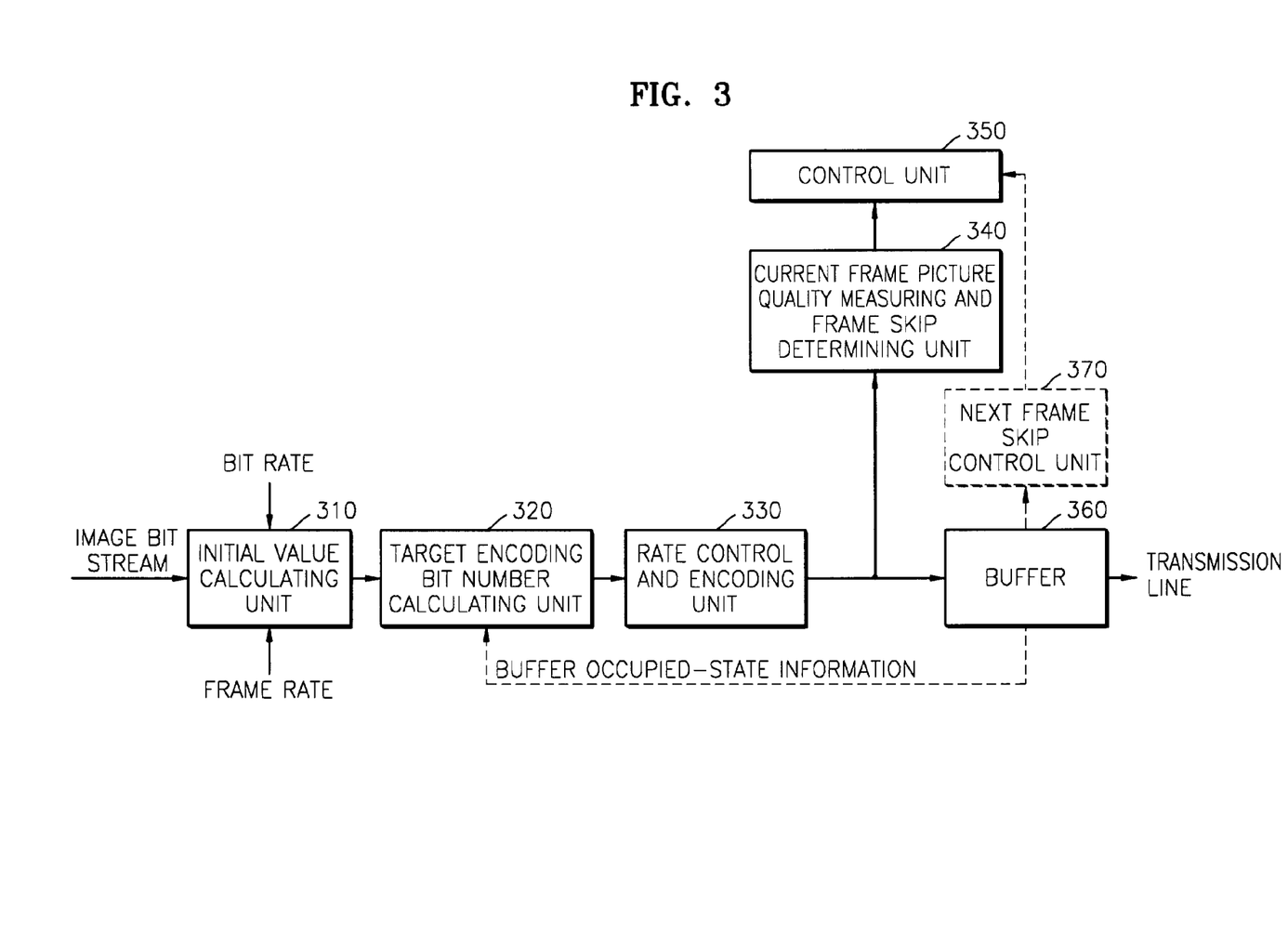
FIG. 3 is a block diagram of a rate control apparatus according to an illustrative, non-limiting embodiment of the present invention.

Referring to a rate control apparatus according to an illustrative, non-limiting embodiment of the present invention shown in FIG. 3, an initial value calculating unit 310 receives a requested bit rate and the number of input frames per second, the input frames that are desired to be encoded. Then, the initial value calculating unit 310 calculates an initial value needed in controlling a bit rate and sends the result to a target encoding bit number calculating unit 320.

The target encoding bit number calculating unit 320 calculates the number of bits that can be assigned to each frame, by using the initial values calculated in the initial value calculating unit 310. Considering the calculated number of bits that can be assigned to each frame and the state of a buffer 360 so as to prevent an overflow or an underflow, the target encoding bit number calculating unit 320 calculates the number of target encoding bits of the frame that is currently being encoded. In the present embodiment, the number of bits that can be assigned to each frame is obtained by subtracting the number of bits that are already encoded and used from the number of the total number of bits for satisfying a requested bit rate, and then dividing the number of remaining bits by the number of remaining frames. Also, selectively, the number of bits that can be assigned to each frame may be obtained by calculation after receiving information on the occupied state of the buffer 360 from the buffer 360.

A rate control and encoding unit 330 controls the encoding process so that a bit stream which is encoded to approximate to the target encoding bit number provided by the target encoding bit number calculating unit 320 is output. This will be explained later referring to FIG. 4.

A current frame picture quality measuring and frame skip determining unit 340 measures the picture quality of the frame encoded in the rate control and encoding unit 330, and if the measure picture quality is lower than a reference picture quality, generates a current frame skip control signal and sends the signal to a control unit 350.

That is, the fact that the picture quality of the current encoded frame measured in the current frame picture quality measuring and frame skip determining unit 340 is degraded lower than the reference picture quality means that the number of bits assigned to the current frame is not enough. In this case, it is highly probable that the number of bits assigned to a frame to be encoded after the current frame will be insufficient again. Here, when frames (for example, P, or B frames) are encoded based on the preceding frame which has been already degraded (for example, I, or P frame), the picture quality of the succeeding frames are badly affected.

Therefore, in the present invention considering these facts, when the picture quality of the current encoded frame is degraded lower than the reference picture quality, the current frame picture quality measuring and frame skip determining unit 340 generates a current frame skip control signal and sends the signal to the control unit 350 in order to prevent an excessive degradation of the picture quality. The control unit 350 skips the current encoded frame according to the frame skip control signal.

The control unit 350 controls the entire encoding process and in particular for rate control, receives the current frame skip control signal from the current frame picture quality measuring and frame skip determining unit 340 and determines whether or not to skip the current encoded frame.

Thus, by obtaining bits through skipping the current encoded frame and assigning the obtained bits to frames to be encoded thereafter, the rate control apparatus minimizes the insufficiency of bits such that degradation of the picture quality can be prevented.

The buffer 360 receives and stores the encoded bit stream from the rate control and encoding unit 330 and then sends the bit stream to a decoder (not shown) through a transmission line.

Selectively, the rate control apparatus according to an illustrative, non-limiting embodiment of the present invention additionally employs a next frame skip determining unit 370 so that encoding of the next frame is controlled according to the state of the buffer 360.

After the encoding process for the current frame is finished, the next frame skip determining unit 370 receives information on the current occupied state of the buffer 360 from the buffer 360. If the filled state of the bit stream in the buffer 360 exceeds a predetermined limit, the next frame skip determining unit 370 generates a frame skip control signal so that the next frame is not encoded in order to prevent loss of image information due to an overflow in the buffer 360.

At this time, the control unit 350 controls whether or not to encode the next frame according to the next frame skip control signal from the next frame skip determining unit 370.

Figure 4:
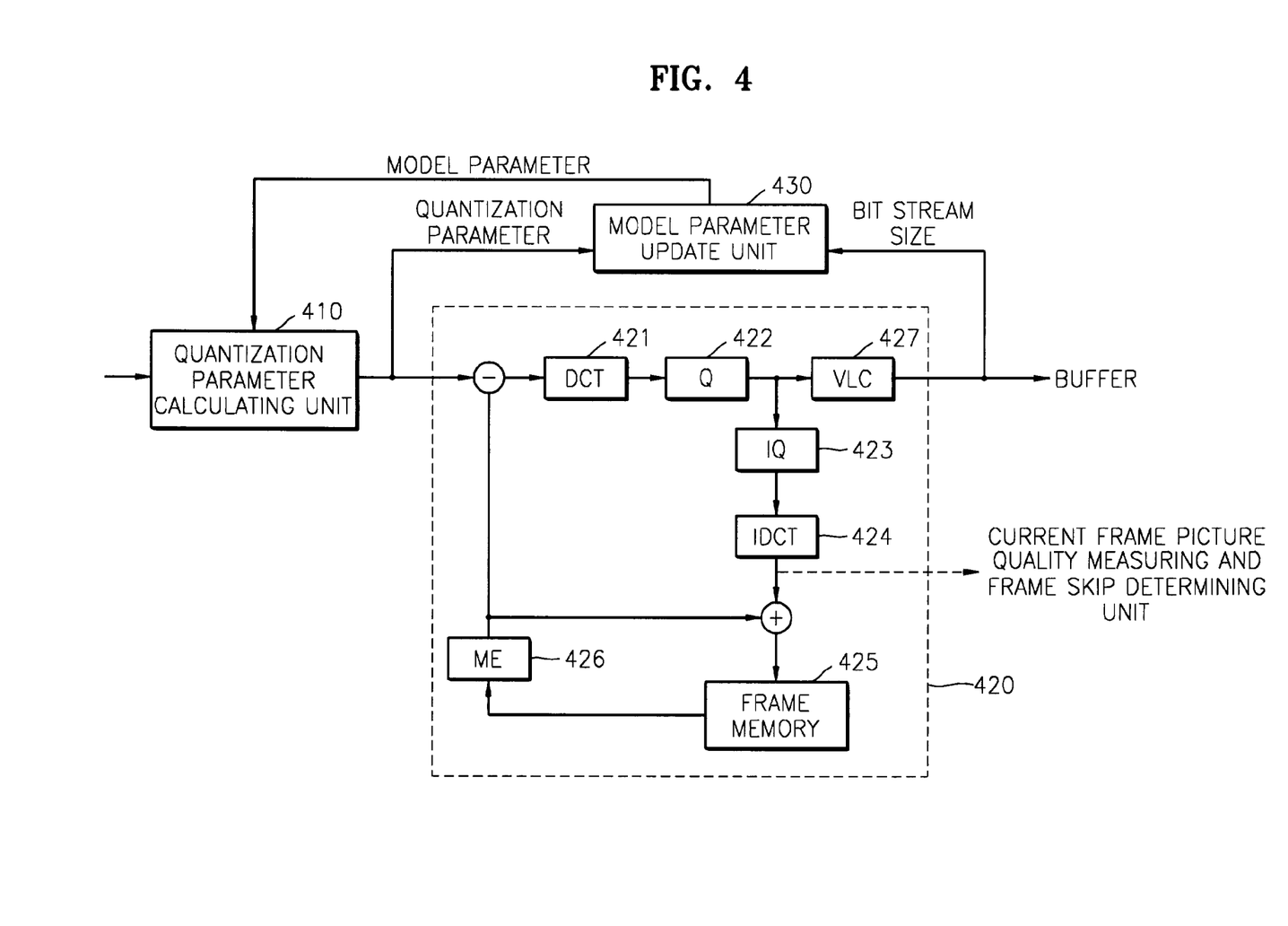
FIG. 4 is a block diagram of a rate control and encoding unit shown in FIG. 3.

FIG. 4 is a block diagram of a rate control and encoding unit 330 shown in FIG. 3 and shows a process for rate control and encoding.

A quantization parameter calculating unit 410 receives a target encoding bit number calculated in the target encoding bit number calculating unit 320, and model parameters for calculating a quantization parameter from a model parameter update unit 430, and calculates a quantization parameter. The calculated quantization parameter is used in the encoding unit 420 and the model parameter update unit 430.

The encoding unit 420 receives the quantization parameter calculated in the quantization parameter calculating unit 410, performs actual encoding, and sends an encoded bit stream to the buffer 360. Also, the encoding unit 420 sends the size of the encoded bit stream to the model parameter update unit 430.

A discrete cosine transform (DCT) unit 421 performs DCT operations on the image bit stream that is being input in units of 8×8 pixel blocks. A quantization (Q) unit 422 performs high efficiency loss compression, in which quantization of the DCT coefficients obtained in the DCT unit 421 is performed, by using quantization parameters calculated in the quantization parameter calculating unit 410, such that the DCT coefficients are expressed by several representative values.

An inverse quantization (IQ) unit 423 inverse quantizes image data that are quantized in the quantization unit 422. The inverse discrete cosine transform (IDCT) unit 424 performs IDCT transform for the image data inverse quantized in the IQ unit 423 and selectively sends the IDCT transformed bit stream to the current frame picture quality measuring and frame skip determining unit 340.

A frame memory unit 425 stores image data IDCT transformed in the IDCT unit 424, in units of frames. A motion estimation (ME) unit 426 calculates a motion vector (MV) for each macro block, by using the image data of the current frame being input and the image data of the previous frame stored in the frame memory unit 425.

A variable length coding (VLC) unit 427 performs VLC for the input bit stream, sends the encoded bit stream to the buffer 360 and sends information on the size of the encoded bit stream to the model parameter update unit 430.

Figure 5:
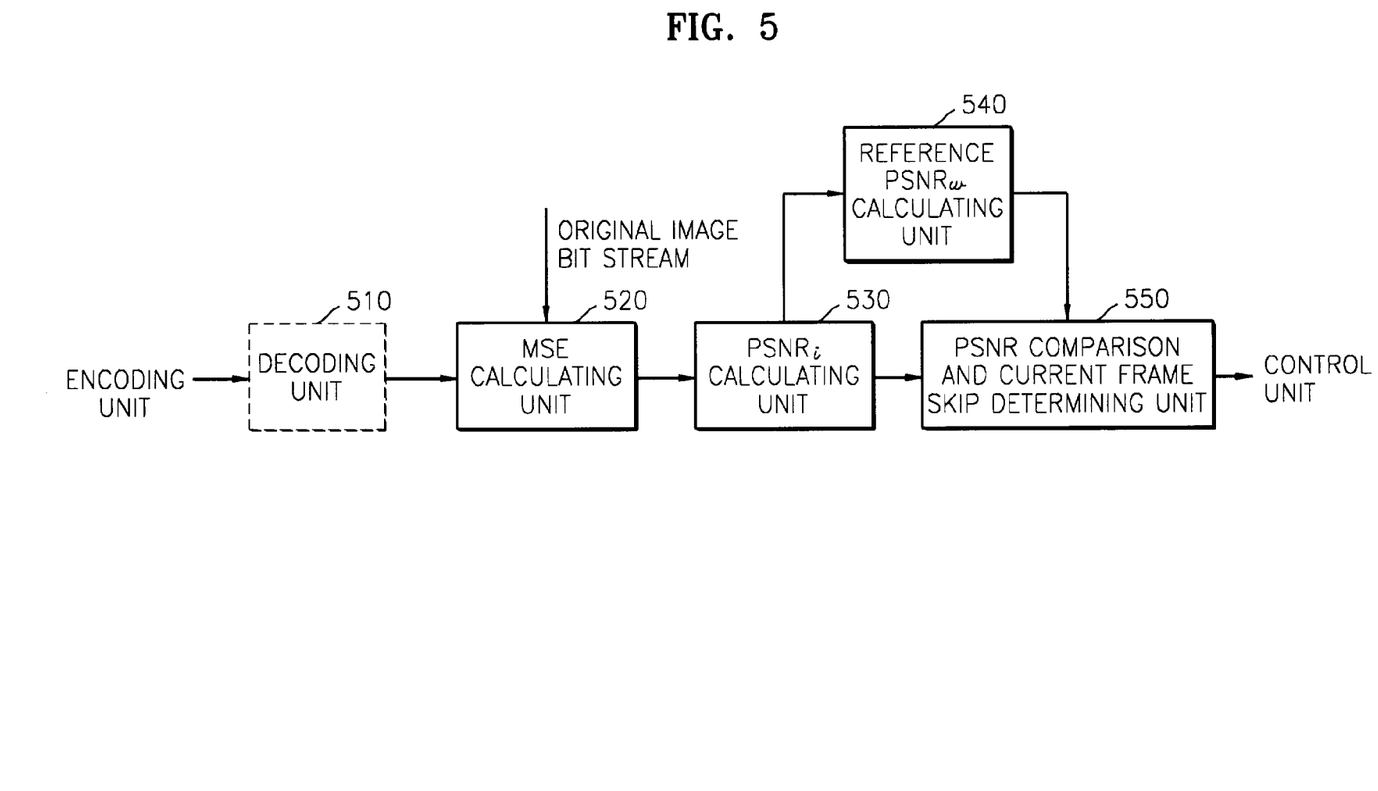
FIG. 5 is a block diagram of a current frame picture quality measuring and frame skip determining unit shown in FIG. 3.

FIG. 5 is a block diagram of the current frame picture quality measuring and frame skip determining unit 340 shown in FIG. 3.

A mean square error (MSE) unit 520 receives an original image bit stream received from the outside and the bit stream decoded in the IDCT unit 424 of the encoding unit 420, and calculates an MSE according to the following equation 1:

$$MSE = \frac{1}{M^2}\sum_{i=0}^{M}\sum_{j=0}^{M}(x_{ij} - x'_{ij})^2 \quad (1)$$

Here, $x_{ij}$ and $x'_{ij}$ denote the pixels of the original image bit stream and the pixels of the corresponding decoded image bit stream, respectively, and both have a size of M×M.

Though the decoded bit stream is provided by the IDCT unit 424 of the encoding unit 420 and then is used in the present embodiment, it is also possible to selectively use an additional decoding unit 510 to obtain a decoded bit stream, as shown in FIG. 5.

A $PSNR_i$ (peak signal-to-noise ratio) calculating unit 530 calculates PSNR of the current frame, that is, the i-th frame, according to the following equation 2:

$$PSNR_i = 10\log_{10}\frac{(P-P)^2}{MSE_i} \quad (2)$$

Here, $MSE_i$ denotes the mean square error of the i-th frame and P-P denotes the peak-to-peak interval of the original image.

Though the picture quality of the current encoded frame is measured by using the PSNR in the present embodiment, it is also possible to selectively use a signal-to-noise ratio (SNR) according to the following equation 3:

$$SNR_i = 10\log_{10}\frac{\sigma_x^2}{MSE_i} \quad (3)$$

Here, $\sigma_x$ denotes the dispersion value of the original image.

Measuring the picture quality of the current encoded frame by using the PSNR obtained by the equation 2 will now be explained.

A $PSNR_w$ calculating unit 540 calculates a reference PSNR, that is, $PSNR_w$, by applying a sliding window to the frames that are previously encoded and provided by a $PSNR_i$ calculating unit 530. The $PSNR_w$ is determined as a value that is K dB lower or higher than the mean PSNR value of the frames in the sliding window. Here, the constant K can be arbitrarily determined by considering the characteristics of the input images.

The $PSNR_w$ calculating unit 540 accumulates a PSRN value calculated when each frame is encoded, within the scope of the sliding window and updates a first reference PSNR value according to the following equation 4:

$$PSNR_{lower\text{-}threshold} = \frac{1}{W_{PSNR}}\sum_{i=k}^{k+W_{PSNR}}PSNR_i - K \quad (4)$$

Here, $PSNR_{lower\text{-}threshold}$ denotes the first reference PSNR for determining whether or not to skip the current encoded frame, $W_{PSNR}$ denotes the size of the sliding window, and $PSNR_i$ denotes the PSNR of the i-th frame.

A PSNR comparison and current frame skip determining unit 550 compares the PSNR of the current encoded frame and the first reference PSNR and, if the PSNR of the current frame is lower than the first reference PSNR, generates a current frame skip signal and sends the signal to the control unit 350.

The control unit 350 receives the current frame skip control signal from the PSNR comparison and current frame skip determining unit 550, skips the current encoded frame that is encoded in the rate control and encoding unit 330, and assigns thus obtained bits for encoding of the next frame.

Figure 6:
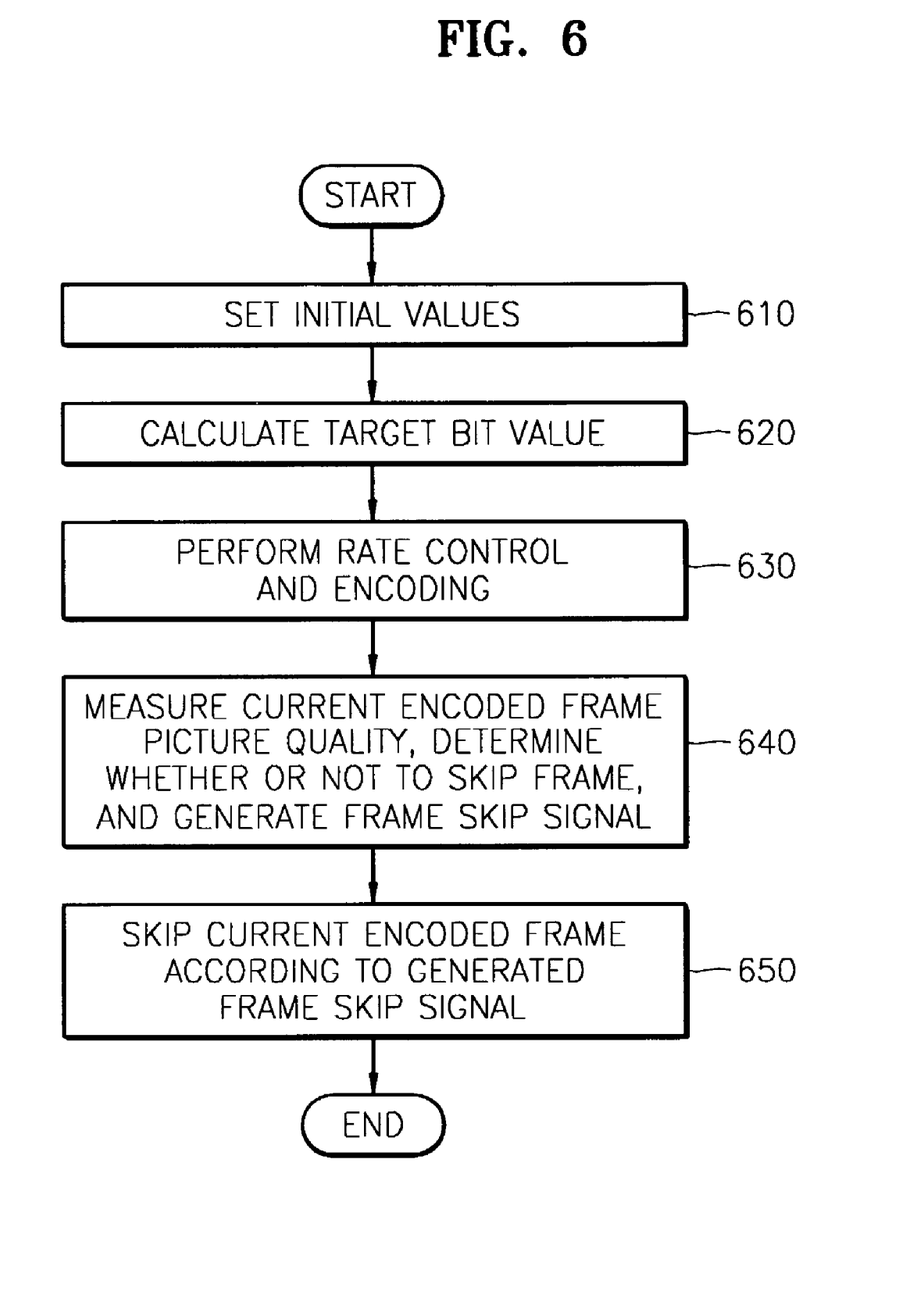
FIG. 6 is a flowchart showing a rate control method according to an illustrative, non-limiting embodiment of the present invention.

FIG. 6 is a flowchart showing a rate control method according to an illustrative, non-limiting embodiment of the present invention.

In step 610, a requested bit rate and the number of input frames per second of an image desired to be encoded are received and then initial values required for rate control are calculated.

In step 620, by using the initial values calculated in the step 610, the number of bits that can be assigned to each frame is calculated and then a target encoding bit number of the frame currently being encoded is calculated by considering the calculated number of bits that can be assigned to each frame and the state of the buffer so that an overflow or an underflow does not occur.

In step 630, the encoding process is controlled so that a bit stream that is encoded to approximate the target encoding bit number calculated in step 620 is output.

In step 640, the picture quality of the current encoded bit stream, for example, the current encoded frame, is measured and if the measured picture quality is lower than the reference picture quality, determines a current frame skip. Though the picture quality is measured by using the PSNR in the present embodiment of the present invention, it is possible to selectively use the SNR or MSE for measuring the picture quality. The reference PSNR which is compared with the PSNR of the current frame is determined as a value, K dB higher or lower than the mean value of the PSNR obtained by applying a sliding window to the frames that are previously encoded. Here, the constant K can be arbitrarily determined considering the characteristics of the input image.

In step 650, according to the determination of step 640 on whether or not to skip the current frame, the current encoded frame is skipped and thus obtained bits are assigned for encoding the next frames.

Figure 7:
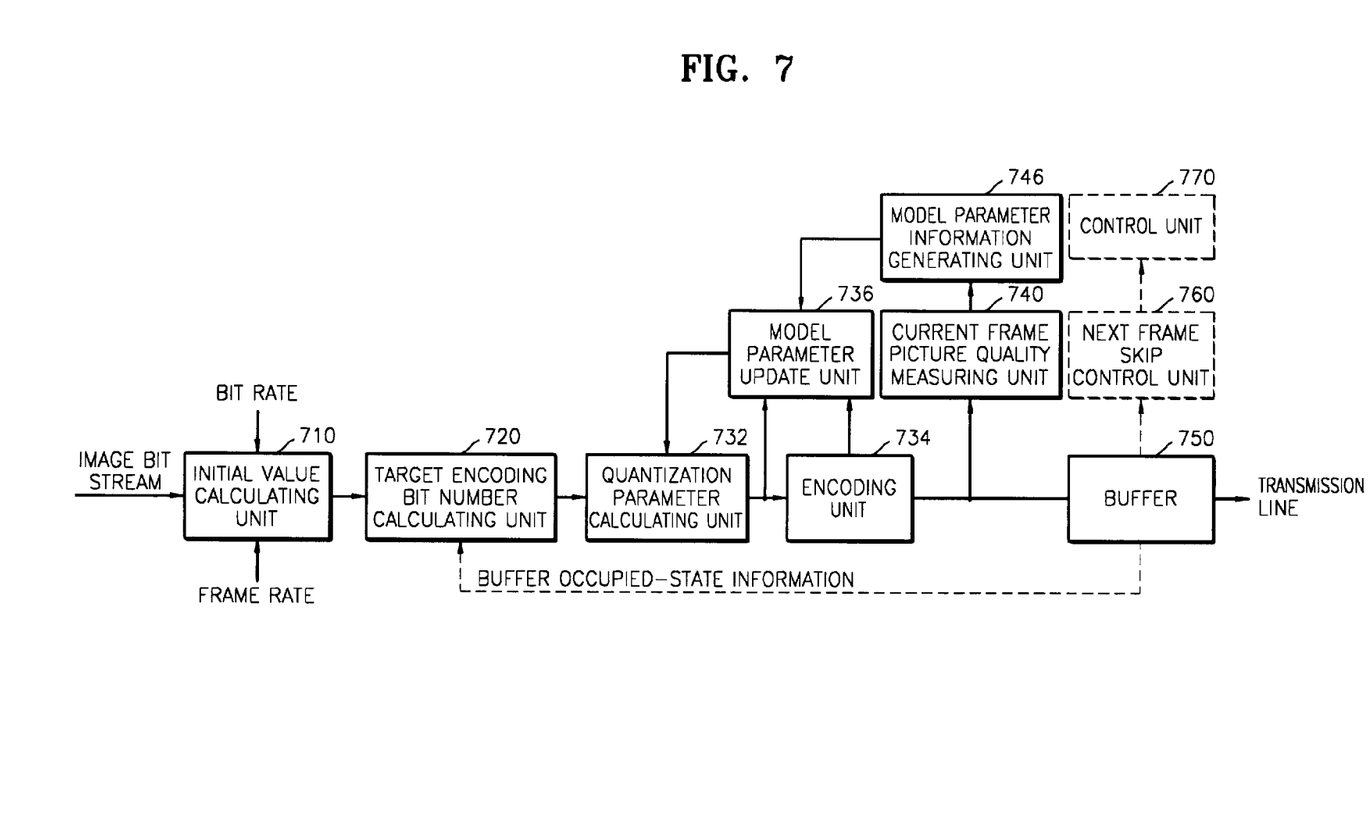
FIG. 7 is a block diagram of a rate control apparatus according to another illustrative, non-limiting embodiment of the present invention.

FIG. 7 is a block diagram of a rate control apparatus according to another illustrative, non-limiting embodiment of the present invention. An initial value calculating unit 710, a target encoding bit number calculating unit 720, a next frame skip determining unit 760, and a control unit 770 have the same functions as in the rate control apparatus shown in FIG. 3 and accordingly for simplification of explanation, the explanation of those will be omitted.

A quantization parameter calculating unit 732 receives a target encoding bit number calculated in the target encoding bit number calculating unit 720 and a model parameter for calculating a quantization parameter provided by the model parameter update unit 736, and calculates a quantization parameter. The calculated quantization parameter is used in the encoding unit 734 and the model parameter update unit 736.

The encoding unit 734 receives the quantization parameter calculated in the quantization calculating unit 732, performs an actual encoding, sends the encoded bit stream to the buffer 750, and sends information on the encoded bit stream to the model parameter update unit 736.

The model parameter update unit 736 updates a model parameter by using the quantization parameter information calculated in the quantization parameter calculating unit 732 and the information on the size of the bit stream encoded in the encoding unit 734. That is, the model parameter update unit 736 updates the model parameter by using the quantization parameter value that was already used and the size of the bit stream that is encoded according to the quantization parameter value. At this time, the information used here includes the quantization parameter value and size information of the encoded bit stream that are used for frames in the range of a sliding window, after applying the sliding window to the frames close to the currently encoded frame on the time axis. Thus, the model parameter update unit 736 employs the sliding window method and updates a model by reflecting the images encoded to the current frame.

A current frame picture quality measuring unit 740 measures the picture quality of the frame encoded in the encoding unit 734 and compares the picture quality with a reference picture quality. If the picture quality measured in the current frame picture quality measuring unit 740 greatly exceeds the range of the reference picture quality, a model parameter information generating unit 746 generates model parameter update information, that is, information on the size of a sliding window to be updated, and sends the information to the model parameter update unit 736.

If the picture quality of the current encoded frame measured in the current frame picture quality measuring unit 740 is degraded lower than the reference level range or is improved higher than the reference level range, the rate distortion (RD) model that is currently applied for rate control is not appropriate.

Thus, in the present invention, if the picture quality measured in the current frame picture quality measuring unit 740 exceeds the reference picture quality range, the RD model is updated so that shortage or excessive supply of bits assigned to the frames to be encoded thereafter does not occur. That is, in a model update method according to the present invention, the size of the sliding window that is used in updating a model in the prior art is reduced and using the reduced data, the model is updated. By reducing the size of the sliding window, only the image data having similar characteristics to the image data currently being encoded are used, while image data having different characteristics are discarded. Accordingly, more accurate quantization values for the succeeding frames can be calculated based on a more accurate RD model, and therefore the performance of the rate control thereafter improves.

Figure 8:
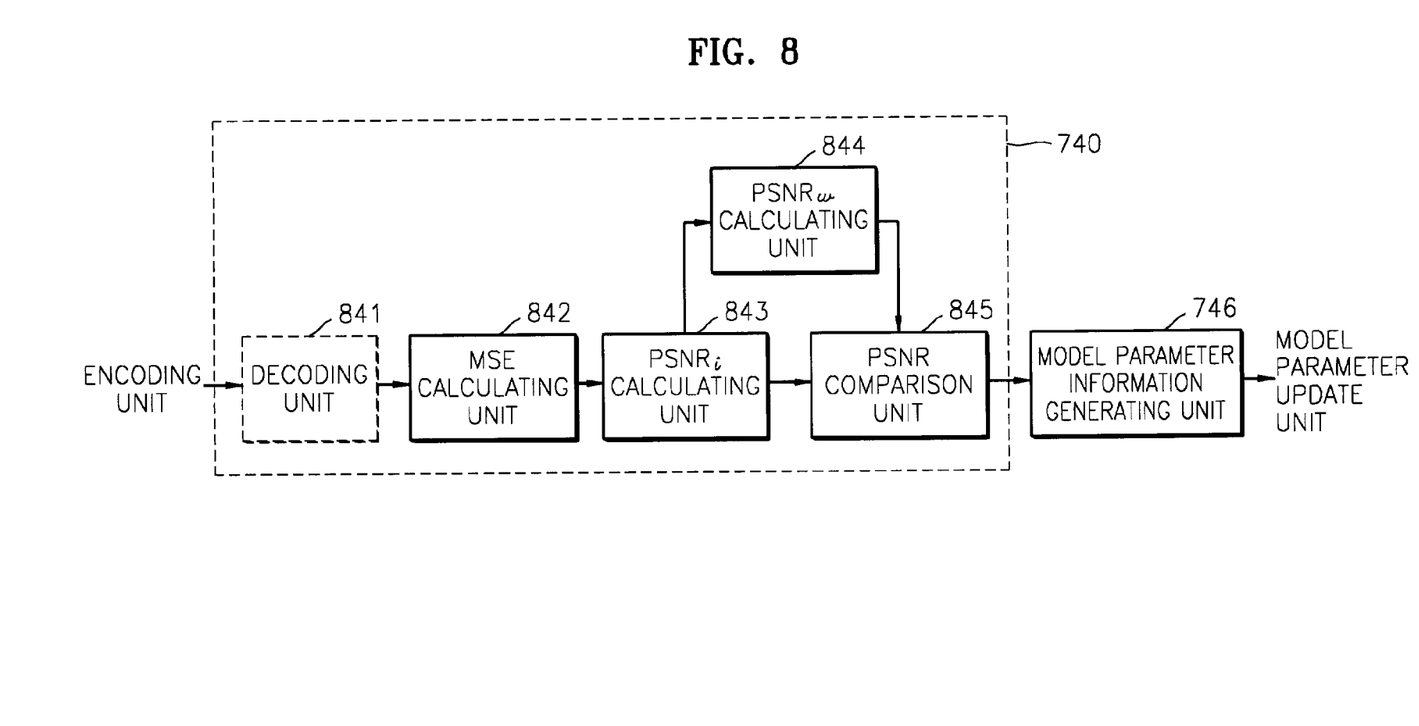
FIG. 8 is a block diagram of a current picture quality measuring unit and a model parameter information generating unit shown in FIG. 7.

FIG. 8 is a block diagram of the current picture quality measuring unit 740 and the model parameter information generating unit 746 shown in FIG. 7.

A mean square error (MSE) calculating unit 842 and the current frame $PSNR_i$ calculating unit 843 have the same functions as the MSE calculating unit 520 and the current frame $PSNR_i$ calculating unit 530 of FIG. 5, and therefore the explanation will be omitted for simplification.

A reference PSNR calculating unit, that is, a reference $PSNR_w$ calculating unit 844, applies a sliding window for the frames that were previously encoded and provided by the $PSNR_i$ calculating unit 843, obtains the mean value of PSNR, and then subtracts K dB from or adds K dB to the mean value of PSNR. By doing so, the reference $PSNR_w$ calculating unit 844 calculates a first reference PSNR and a second PSNR (here, the first PSNR<the second PSNR). Here, the constant K can be arbitrarily determined considering the characteristics of input images.

The reference $PSNR_w$ calculating unit 844 accumulates a PSNR value that is calculated when each frame is encoded, within the scope of the sliding window and updates the first reference PSNR value according to the above equation 4. Here, $PSNR_{lower-threshold}$ of the equation 4 is used as the first reference PSNR value for determining whether or not to update the model parameter.

Also, the second reference PSNR value is updated according to the following equation 5:

$$PSNR_{upper-threshold} = \frac{1}{W_{PSNR}} \sum_{i=k}^{k+W_{PSNR}} PSNR_i + K \qquad (5)$$

Here, the $PSNR_{upper-threshold}$ is used as the second reference threshold together with the first reference PSNR value for determining whether or not to update the model parameter.

A PSNR comparison unit 845 compares the PSNR of the current frame with the first reference PSNR and the second reference PSNR, and if the PSNR value of the current frame is less than the first reference PSNR that is the minimum reference PSNR, or is greater than the second reference PSNR that is the maximum reference PSNR, determines whether or not to update the model parameter according to this.

If the result of the comparison of the PSNR value of the current frame with the first reference PSNR value by the PSNR comparison unit 845 indicates that the PSNR value of the current frame is less than the first reference PSNR value, a model parameter information generating unit 746 searches for a part where the number of bits suddenly increases in the data in the sliding window of the RD model that is currently applied, adjusts the size of the sliding window to be a window beginning from the part where the number of bits suddenly increases to the present point, and sends the information on the adjusted size of the sliding window to the model parameter update unit 736.

Also, if the result of the comparison of the PSNR value of the current frame with the second reference PSNR value by the PSNR comparison unit 845 indicates that the PSNR value of the current frame is greater than the second reference PSNR value, the model parameter information generating unit 746 searches for a part where the number of bits suddenly decreases in the data in the sliding window of the RD model that is currently applied, adjusts the size of the sliding window to be a window beginning from the part where the number of bits suddenly decreases to the present point, and sends the information on the adjusted size of the sliding window to the model parameter update unit 736.

Figure 9:
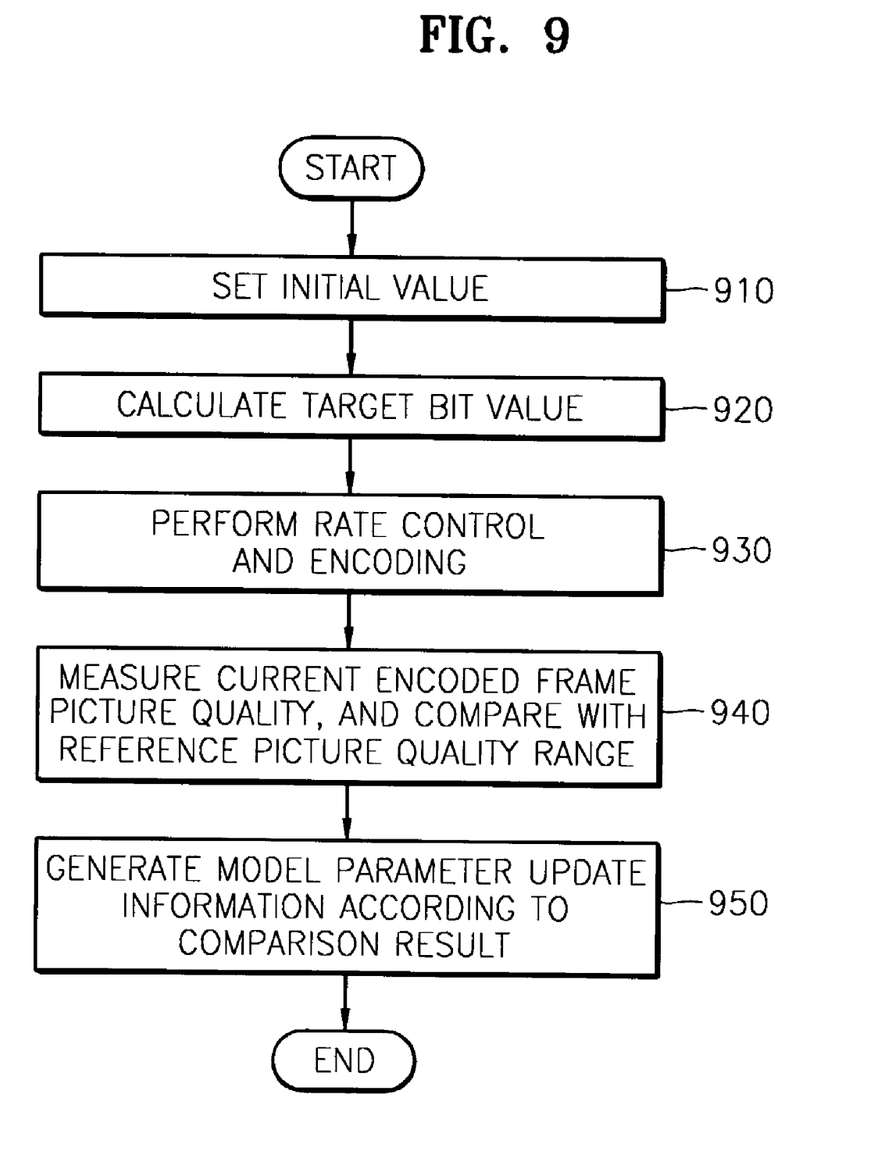
FIG. 9 is a flowchart showing a rate control method according to another illustrative, non-limiting embodiment of the present invention.

FIG. 9 is a flowchart showing a rate control method according to another illustrative, non-limiting embodiment of the present invention.

In step 910, a requested bit rate and the number of input frames per second of an image desired to be encoded are received, and then initial values required for rate control are calculated.

In step 920, by using the initial values calculated in the step 910, the number of bits that can be assigned to each frame is calculated, and then a target encoding bit number of the frame currently being encoded is calculated by considering the calculated number of bits that can be assigned to each frame and the state of the buffer so that an overflow or an underflow does not occur.

In step 930, the encoding process is controlled so that a bit stream that is encoded to approximate the target encoding bit number calculated in step 920 is output.

In step 940, the picture quality of the current encoded bit stream, for example, the current encoded frame, is measured and it is determined whether or not the measured picture quality is within the scope of the reference picture quality. The reference PSNR scope that is compared with the PSNR of the current frame is between the first reference PSNR and the second reference PSNR that are determined as values, K dB lower and K dB higher, respectively, than the PSNR mean value obtained by applying the sliding window to the frames that were previously encoded. Here, the constant K can be arbitrarily determined considering the characteristics of input images. Though the PSNR is used for measuring the picture quality in the present embodiment, the SNR or MSE can be used selectively.

In step 950, if the PSNR of the current encoded frame determined in the step 940 is less than the first reference PSNR, a part where the number of bits suddenly increases in the data in the sliding window of the RD model that is currently applied is searched for, the size of the sliding window is adjusted to be a window beginning from the part where the number of bits suddenly increases to the present point, and model parameter update information containing information on the adjusted size of the sliding window is generated and sent to the model parameter update unit.

If the PSNR of the current encoded frame is greater than the second reference PSNR, a part where the number of bits suddenly decreases in the data in the sliding window of the RD model that is currently applied is searched for, the size of the sliding window is adjusted to be a window beginning from the part where the number of bits suddenly decreases to the present point, and model parameter update information containing information on the adjusted size of the sliding window is generated and sent to the model parameter update unit.

The present invention is not restricted to the above-described embodiments and many variations are possible within the spirit and scope of the present invention.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

In the rate control method according to the present invention as described above, the picture quality of an encoded bit stream is measured, and if the picture quality of the encoded bit stream is lower than a reference picture quality, the encoded bit stream is skipped so that degradation of the picture quality can be prevented in the space axis and continuation of degradation in the picture quality due to shortage of assigned bits can be prevented. Also, by updating a model parameter, a more accurate RD model is applied for the frames succeeding the current frame such that rate control can be improved.

What is claimed is:

1. A rate control apparatus comprising:
   an initial value setting unit which sets initial values for rate control and encoding;
   a target bit value calculating unit which calculates a target encoding bit value based on the set initial values;
   a bit rate control and encoding unit which performs rate control and encoding of a current bit stream based on the calculated target encoding bit value;
   a picture quality measuring and skip control signal generating unit which measures the picture quality of the current encoded bit stream, determines whether or not to skip the current encoded bit stream by comparing the measured picture quality, with a reference picture quality, and generates a current encoded bit stream skip control signal; and
   a control unit which controls skipping of the current encoded bit stream, based on the current bit stream skip control signal provided by the picture quality measuring and skip control signal generating unit
   wherein the reference picture quality is determined by the picture quality of frames in a sliding window formed by a predetermined number of frames preceding the current frame.

2. The rate control apparatus of claim 1, wherein the unit of the current encoded bit stream measured by the picture quality measuring and skip control signal generating unit is a frame, and the picture quality measuring and skip control signal generating unit determines whether or not to skip the current encoded frame, by comparing the PSNR value of the current frame with a reference PSNR value that is calculated from a PSNR value in a sliding window formed by a predetermined number of frames preceding the current frame.

3. The rate control apparatus of claim 2, wherein the reference PSNR value is obtained by subtracting a predetermined constant from a mean PSNR value of the PSNR values of frames in the sliding window.

4. The rate control apparatus of claim 1, wherein the picture quality measuring and skip control signal generating unit measures the picture quality of the current encoded bit stream by using one group of mean square errors (MSE), PSNR, and signal-to-noise ratios (SNR).

5. The rate control apparatus of claim 2, wherein the picture quality measuring and skip control signal generating unit measures the picture quality of the current encoded bit stream by using one group of mean square errors (MSE), PSNR, and signal-to-noise ratios (SNR).

6. A rate control method comprising:
   setting initial values for rate control and encoding; calculating a target encoding bit value based on the set initial values;
   performing rate control and encoding of a current bit stream based on the calculated target encoding bit value;
   measuring the picture quality of the current encoded bit stream, determining whether or not to skip the current encoded bit stream by comparing the measured picture quality with a reference picture quality, and generating a current encoded bit stream skip control signal; and
   controlling skipping of the current encoded bit stream based on the current bit stream skip control signal,
   wherein the reference picture quality is determined by the picture quality of frames in a sliding window formed by a predetermined number of frames preceding the current frame.

7. The rate control method of claim 6, wherein the unit of the measured bit stream is a frame, and in generating a current bit stream skip control signal, it is determined whether or not to skip the current encoded frame, by comparing the PSNR value of the current frame with a reference PSNR value that is calculated from a PSNR value in a sliding window formed by a predetermined number of frames preceding the current frame.

8. The rate control method of claim 7, wherein the reference PSNR value is obtained by subtracting a predetermined constant from a mean PSNR value of the PSNR values of frames in the sliding window.

9. The rate control method of claim 6, wherein in generating the current bit stream skip control signal, the picture quality of the current encoded bit stream is measured by using one of mean square errors (MSE), PSNR, and signal-to-noise ratios (SNR).

10. The rate control method of claim 7, wherein in generating the current bit stream skip control signal, the picture quality of the current encoded bit stream is measured by using one of mean square errors (MSE), PSNR, and signal-to-noise ratios (SNR).

11. A computer readable medium in a rate control apparatus, the computer readable medium having embodied thereon a computer program when executable by a computer for providing a method comprising:

setting initial values for rate control and encoding;

calculating a target encoding bit value based on the set initial values;

performing rate control and encoding of a current bit stream based on the calculated target encoding bit value;

measuring the picture quality of the current encoded bit stream, determining whether or not to skip the current encoded bit stream by comparing the measured picture quality with a reference picture quality, and generating a current encoded bit stream skip control signal; and controlling skipping of the current encoded bit stream based on the current bit stream skip control signal, wherein the reference picture quality is determined by the picture quality of frames in a sliding window formed by a predetermined number of frames preceding the current frame.

12. The computer readable medium of claim 11, wherein the unit of the measured bit stream is a frame, and in generating a current bit stream skip control signal, it is determined whether or not to skip the current encoded frame, by comparing the PSNR value of the current frame with a reference PSNR value that is calculated from a PSNR value in a sliding window formed by a predetermined number of frames preceding the current frame.

13. The computer readable medium of claim 12, wherein the reference PSNR value is obtained by subtracting a predetermined constant from a mean PSNR value of the PSNR values of frames in the sliding window.

14. The computer readable medium of claim 11, wherein in generating the current bit stream skip control signal, the picture quality of the current encoded bit stream is measured by using one of mean square errors (MSE), PSNR, and signal-to-noise ratios (SNR).

15. The computer readable medium of claim 12, wherein in generating the current bit stream skip control signal, the picture quality of the current encoded bit stream is measured by using one of mean square errors (MSE), PSNR, and signal-to-noise ratios (SNR).

16. A rate control apparatus comprising:

an initial value setting unit which sets initial values for rate control and encoding;

a target bit value calculating unit which calculates a target encoding bit value based on the set initial values;

a rate control and encoding unit which performs bit rate control and encoding of a current bit stream based on the calculated target encoding bit value;

a picture quality measuring unit which measures the picture quality of the current encoded bit stream; and a bit rate control information generating unit which compares the measured picture quality with the scope of a predetermined reference picture quality to determine whether or not the measured picture quality is within the scope, and if the measured picture quality exceeds the scope of the predetermined reference picture quality, generates bit rate control information for rate control and sends the information to the rate control and encoding unit, wherein the scope of a predetermined reference picture quality is determined by the picture quality of frames in a sliding window formed by a predetermined number of frames preceding the current frame.

17. The rate control apparatus of claim 16, wherein the unit of the bit stream measured by the picture quality measuring unit is a frame, and the bit rate control information generating unit determines whether or not to update bit rate control information, by comparing the PSNR value of a current frame with a first reference PSNR value calculated from the PSNR values of frames in a sliding window formed by a predetermined number of frames preceding the current frame, and a second reference PSNR value greater than the first reference PSNR value.

18. The rate control apparatus of claim 17, wherein if the measured picture quality of the current frame is less than the first reference PSNR value, the bit rate control information generating unit searches for a first frame where the number of bits suddenly increases among the frames in the sliding window, determines a scope from the first frame to the current frame as the size of an optimal sliding window, and sends bit rate control information containing the size of the determined optimal sliding window, to the bit rate control and encoding unit.

19. The rate control apparatus of claim 17, wherein if the picture quality of the current frame is greater than the second reference PSNR value, the bit rate control information generating unit searches for a second frame where the number of bits suddenly decreases among the frames in the sliding window, determines a scope from the second frame to the current frame as the size of an optimal sliding window, and sends bit rate control information containing the size of the determined optimal sliding window, to the rate control and encoding unit.

20. The rate control apparatus of claim 17, wherein the first reference PSNR value is obtained by subtracting a predetermined constant from a mean PSNR value of the PSNR values of frames in the sliding window and the second reference PSNR value is obtained by adding a predetermined constant to a mean PSNR value of the PSNR values of frames in the sliding window.

21. The rate control apparatus of claim 16, wherein the picture quality measuring unit measures the picture quality of the current encoded bit stream by using one of mean square errors (MSE), PSNR, and signal-to-noise ratios (SNR).

22. The rate control apparatus of claim 17, wherein the picture quality measuring unit measures the picture quality of the current encoded bit stream by using one of mean square errors (MSE), PSNR, and signal-to-noise ratios (SNR).

23. A rate control method comprising:
setting initial values for rate control and encoding;
calculating a target encoding bit value based on the set initial values;
performing rate control and encoding of a current bit stream based on the calculated target encoding bit value;
measuring the picture quality of the current encoded bit stream; and
comparing the measured picture quality with the scope of a predetermined reference picture quality to determine whether or not the measured picture quality is within the scope, and if the measured picture quality exceeds the scope of the predetermined reference picture quality, updating a bit rate control information for rate control,
wherein the scope of a predetermined reference picture quality is determined by the picture quality of frames in a sliding window formed by a predetermined number of frames preceding the current frame.

24. The rate control method of claim 23, wherein the unit of the measured bit stream is a frame, and in generating the bit rate control information, it is determined whether or not to update the bit rate control information, by comparing the PSNR value of a current frame with a first reference PSNR value calculated from the PSNR values of frames in a sliding window formed by a predetermined number of frames preceding the current frame, and a second reference PSNR value greater than the first reference PSNR value.

25. The rate control method of claim 24, wherein in updating the bit rate control information, if the measured picture quality of the current frame is less than the first reference PSNR value, a first frame where the number of bits suddenly increases among the frames in the sliding window is searched for, a scope from the first frame to the current frame is determined as the size of an optimal sliding window, and the bit rate control information is updated by the size of the determined optimal sliding window.

26. The bit rate control method of claim 24, wherein in generating the bit rate control information, if the measured picture quality of the current frame is greater than the second reference PSNR value, a second frame where the number of bits suddenly decreases among the frames in the sliding window is searched for, a scope from the second frame to the current frame is determined as the size of an optimal sliding window, and the bit rate control information is updated by the size of the determined optimal sliding window.

27. The bit rate control method of claim 24, wherein the first reference PSNR value is obtained by subtracting a predetermined constant from a mean PSNR value of the PSNR values of frames in the sliding window and the second reference PSNR value is obtained by adding a predetermined constant to a mean PSNR value of the PSNR values of frames in the sliding window.

28. A computer readable medium in a rate control apparatus, the computer readable medium having embodied thereon a computer program when executable by a computer for providing a method comprising:
setting initial values for rate control and encoding;
calculating a target encoding bit value based on the set initial values;
performing rate control and encoding of a current bit stream based on the calculated target encoding bit value;
measuring the picture quality of the current encoded bit stream; and
comparing the measured picture quality with the scope of a predetermined reference picture quality to determined whether or not the measured picture quality is within the scope, and if the measured picture quality exceeds the scope of the predetermined reference picture quality, updating a bit rate control information for rate control,
wherein the scope of a predetermined reference picture quality is determined by the picture quality of frames in a sliding window formed by a predetermined number of frames preceding the current frame.

29. The computer readable medium of claim 28, wherein the unit of the measured bit stream is a frame, and in generating the bit rate control information, it is determined whether or not to update bit rate control information, by comparing the PSNR value of a current frame with a first reference PSNR value calculated from the PSNR values of frames in a sliding window formed by a predetermined number of frames preceding the current frame, and a second reference PSNR value greater than the first reference PSNR value.

30. The computer readable medium of claim 29, wherein in updating the bit rate control information, if the measured picture quality of the current frame is less than the first reference PSNR value, a first frame where the number of bits suddenly increases among the frames in the sliding window is searched for, a scope from the first frame to the current frame is determined as the size of an optimal sliding window, and the bit rate control information is updated by the size of the determined optimal sliding window.

31. The computer readable medium of claim 29, wherein in generating the bit rate control information, if the measured picture quality of the current frame is greater than the second reference PSNR value, a second frame where the number of bits suddenly decreases among the frames in the sliding window is searched for, a scope from the second frame to the current frame is determined as the size of an optimal sliding window, and the bit rate control information is updated by the size of the determined optimal sliding window.

32. The computer readable medium of claim 29, wherein the first reference PSNR value is obtained by subtracting a predetermined constant from a mean PSNR value of the PSNR values of frames in the sliding window and the second reference PSNR value is obtained by adding a predetermined constant to a mean PSNR value of the PSNR values of frames in the sliding window.

* * * * *